US006897891B2

(12) United States Patent
Itsukaichi (10) Patent No.: US 6,897,891 B2
(45) Date of Patent: May 24, 2005

(54) COMPUTER SYSTEM USING A DIGITAL CAMERA THAT IS CAPABLE OF INPUTTING MOVING PICTURE OR STILL PICTURE DATA

(75) Inventor: Masakatsu Itsukaichi, Asaka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 851 days.

(21) Appl. No.: 09/738,772

(22) Filed: Dec. 18, 2000

(65) Prior Publication Data

US 2001/0004266 A1 Jun. 21, 2001

(30) Foreign Application Priority Data

Dec. 20, 1999 (JP) ............................................ 11-360815

(51) Int. Cl.⁷ ........................ H04N 5/225; H04N 5/232; H04N 7/14
(52) U.S. Cl. ................ 348/14.1; 348/220.1; 348/207.1; 348/207.11; 348/211.12; 348/14.14
(58) Field of Search .......................... 348/220.1, 207.1, 348/207.11, 211.12, 14.14, 14.1, 14.08

(56) References Cited

U.S. PATENT DOCUMENTS 6,359,643 B1 * 3/2002 Visvanathan et al. .... 348/14.14
6,583,809 B1 * 6/2003 Fujiwara ................... 348/14.12
6,611,284 B2 * 8/2003 Lourie et al. ............. 348/207.1
6,720,998 B1 * 4/2004 Kim ........................ 348/220.1
2003/0030729 A1 * 2/2003 Prentice et al. .......... 348/220.1
2003/0085988 A1 * 5/2003 Fujiwara .................... 348/14.1

FOREIGN PATENT DOCUMENTS

| JP | 10-126756 | 5/1998 |
| JP | 10-136245 | 5/1998 |
| JP | 10-155133 | 6/1998 |
| JP | 10-232924 | 9/1998 |

* cited by examiner

Primary Examiner—Wendy R. Garber
Assistant Examiner—James M. Hannett
(74) Attorney, Agent, or Firm—McGinn & Gibb, PLLC

(57) ABSTRACT

A host computer includes a device driver which is adaptive to a digital camera and has a storage driver function for writing/reading image data representative of a still picture in/out of the camera by bulk transfer, an image driver function for receiving image data representative of a moving picture from the camera by isochronous transfer, an audio driver function for receiving speech data from the camera by isochronous transfer, and an operation driver function having operation commands on the shooting operation of the camera. During an electronic conference the host can receive image data representative of a moving picture and speech data as well as, if necessary, image data representative of a still picture prepared beforehand from the camera. The host also can receive image data representative of a new still picture taken during the conference from the camera.

25 Claims, 4 Drawing Sheets

COMPUTER SYSTEM USING A DIGITAL CAMERA THAT IS CAPABLE OF INPUTTING MOVING PICTURE OR STILL PICTURE DATA

BACKGROUND OF THE INVENTION

1. Field of the Invention

The present invention relates to a computer system using a digital camera and more particularly to a computer system using a digital camera and advantageously applicable to an electronic conference system or similar real-time transmission system.

2. Description of the Background Art

Today, thanks to the increasing processing speed and performance of a CPU (Central Processing Unit), personal computers, for example, are extensively used as communication tools capable of dealing with multimedia data including video data and audio data. For example, a plurality of personal computers may be connected together by a communication channel in order to construct an electronic conference system. In this kind of system, the personal computers each can send the real-time image of the individual situation and real-time speech to the other computer or computers.

Japanese patent laid-open publication No. 126756/1998, for example, discloses a computer system applicable to the electronic conference system. Basically, in the computer system disclosed in this document, a video capture board is mounted on a host computer, e.g., a personal computer. The video capture board transforms an analog moving picture signal input from a video camera to digital moving picture data. The digital moving picture data are sent from the host computer to another computer joining in a conference via, e.g., a MODEM.

However, not many of personal computers available on the today's market are loaded with a video capture board as standard equipment. A video capture board must therefore be installed in a personal computer by troublesome manual operation. While a video capture board may be connected to a personal computer, the connection is not practicable without resorting to, e.g., a printer port, resulting in a short data transfer rate.

A USB (Universal Serial Bus) interface, which is a high-speed serial interface increasingly equipped with as standard equipment, may be substituted for a video capture board having the above-described problems. A moving picture inputting system or an image pickup apparatus constructed to input moving picture data to a host computer via a USB interface is disclosed in, e.g., Japanese Patent Laid-Open Publication Nos. 136245/1998, 155133/1998 and 232924/1998. In this type of system or apparatus, a CCD (Charge Coupled Device) or similar image pickup apparatus transforms an image signal output from an image sensor to digital image data and stores the digital image data in a field memory or a FIFO (First-In First-Out) memory. The digital image data are read out of the memory at a timing and in an amount matching with the transfer rate of the USB interface. This allows moving picture data to be transferred from the image pickup apparatus to a host computer via the USB interface.

In an electronic conference system, a person participating in a conference sometimes desires to present a material while discussing with the other person. In such a case, the material must be input to a host computer and then sent to the other participant. In the above-described conventional system, for example, the material may be shot by a video camera or a CCD camera and then sent in the form of moving picture data. However, resolution available with a video camera or a CCD camera is too poor for the material to be read. It is therefore necessary to connect a scanner or similar peripheral unit to the host computer so as to input data representative of the material to the host computer beforehand or to read the material and send the resulting data each time. The peripheral unit connected to the host computer makes the entire system and manipulation thereof sophisticated.

SUMMARY OF THE INVENTION

It is therefore an object of the present invention to provide a computer system using a digital camera and capable of inputting image data representative of a moving picture or a still picture taken beforehand or taken on the spot in a host computer with a simple configuration.

In accordance with the present invention, a computer system is generally made up of a host computer, a digital camera for picking up a scene with an image sensor and recording image data representative of the scene in a recording medium, and a high-speed serial interface connecting the digital camera to the host computer. The host computer includes a device driver having at least a first device function for recognizing the camera as a storage driver, which records data representative of a still picture, and writing or reading the image data in or out of the recording medium, a second device function for recognizing the camera as an image device, which generates image data representative of a moving picture, and reading the image data out of the image sensor at a preselected period, and a third device function for recognizing the camera as an operating device and feeding an operation command to the digital camera. The camera includes a controller for driving, in response to an access made from any one of the first to third device functions of the host computer via the high-speed serial interface, the portions of the camera corresponding to the access to thereby control data transfer and a shooting operation.

Also, in accordance with the present invention, in a digital camera for picking up a scene with an image sensor and recording image data representative of the scene in a recording medium and operable under the control of an outside apparatus via a high-speed serial interface, the outside apparatus includes a device driver having at least a first device function for recognizing the camera as a storage driver, which records data representative of a still picture, and writing or reading the image data in or out of the recording medium, a second device function for recognizing the camera as an image device, which generates image data representative of a moving picture, and reading the image data out of the image sensor at a preselected period, and a third device function for recognizing the camera as an operating device and feeding an operation command to the digital camera. The camera includes a controller for driving, in response to an access made from any one of the first to third device functions of the host computer via the high-speed serial interface, the portions of the digital camera corresponding to the access to thereby control data transfer and a shooting operation.

BRIEF DESCRIPTION OF THE DRAWINGS

The above and other objects, features and advantages of the present invention will become more apparent from the following detailed description taken with the accompanying drawings in which:

FIG. 2 shows how FIGS. 2A and 2B are combined;

FIGS. 2A and 2B are schematic block diagrams each showing particular part of hardware included in the illustrative embodiment;

DESCRIPTION OF THE PREFERRED EMBODIMENT

Figure 1:
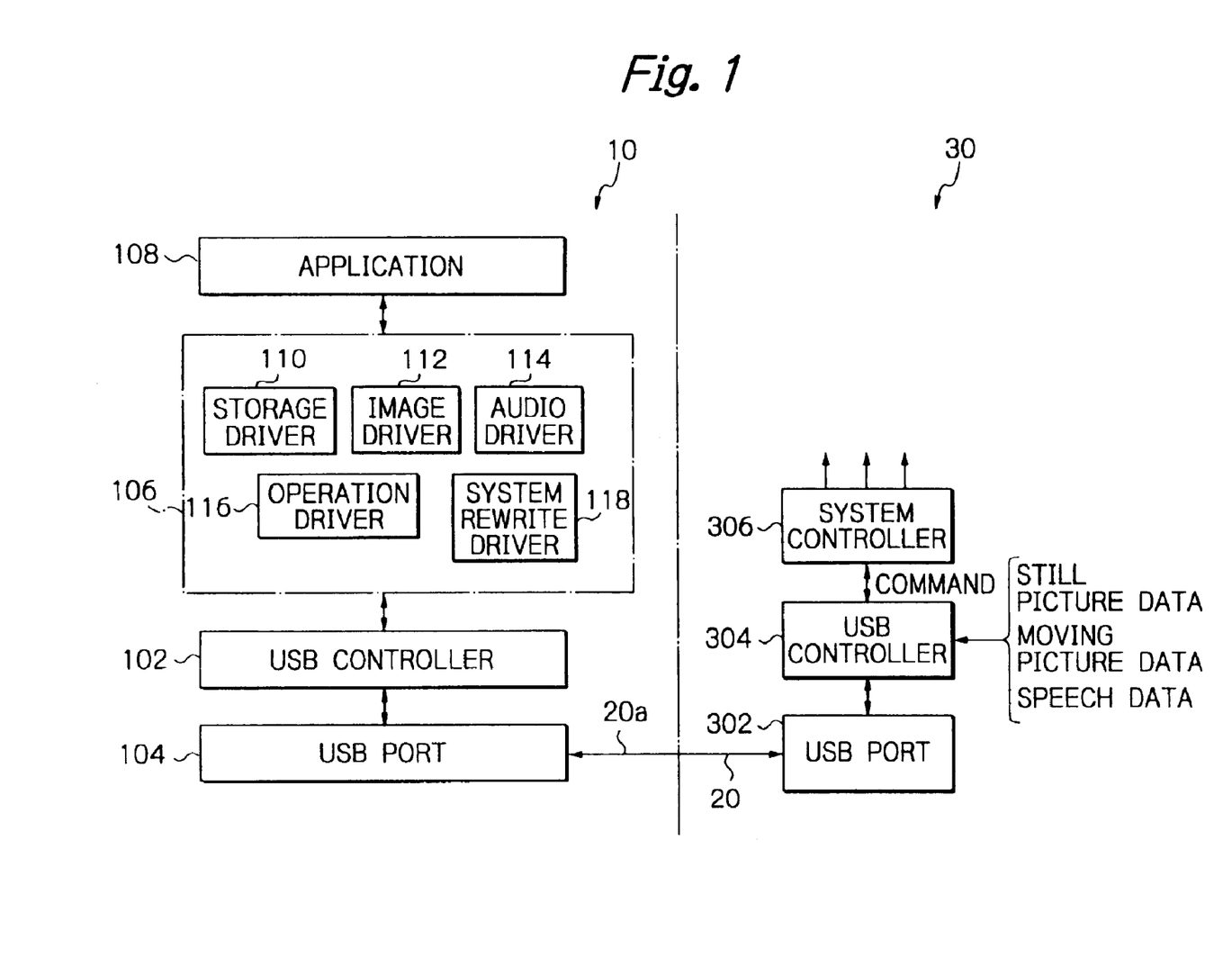
FIG. 1 is a block diagram showing a computer system using a digital camera embodying the present invention and corresponding to a protocol.
Figures 2, 2A:
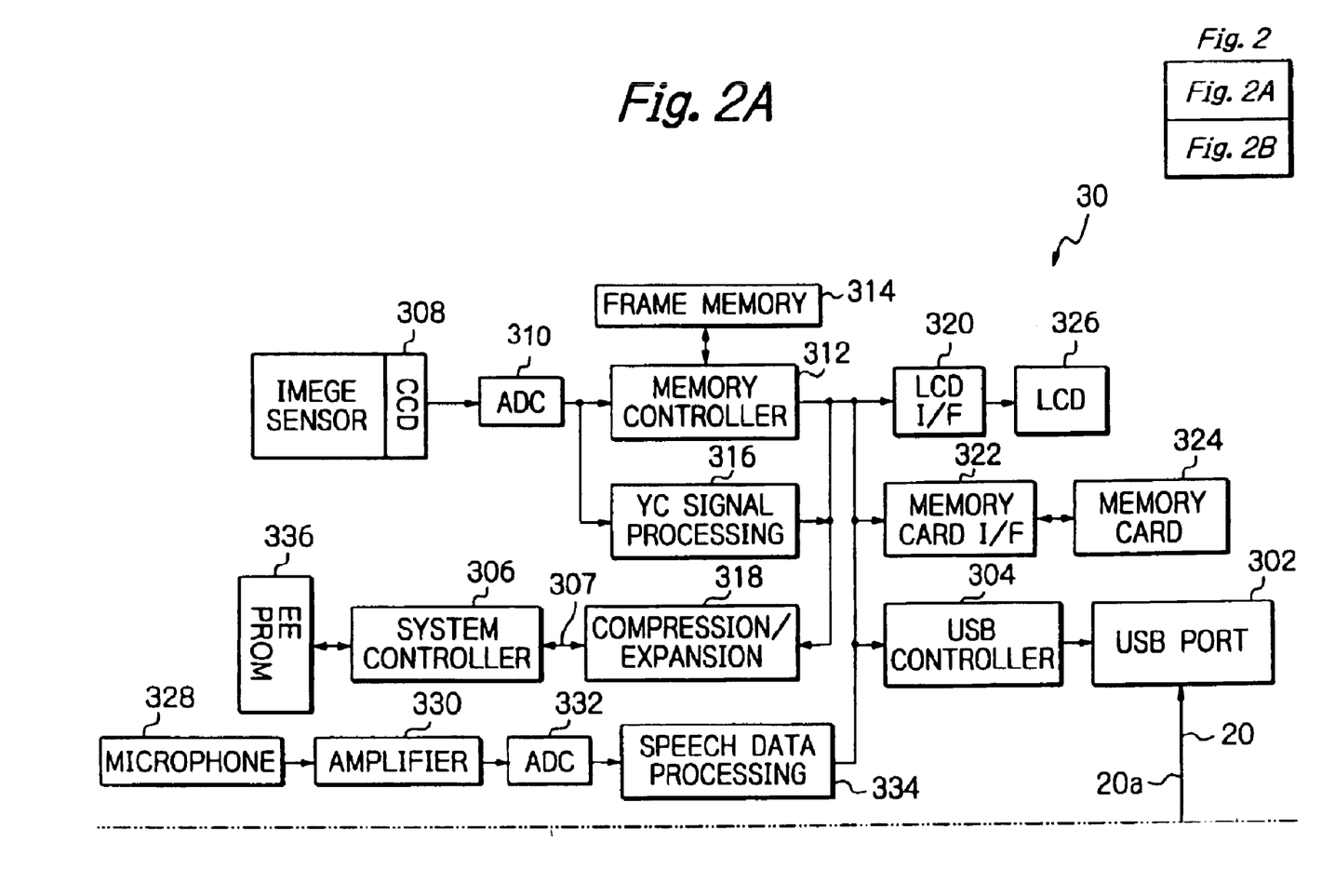
Figure 2B:
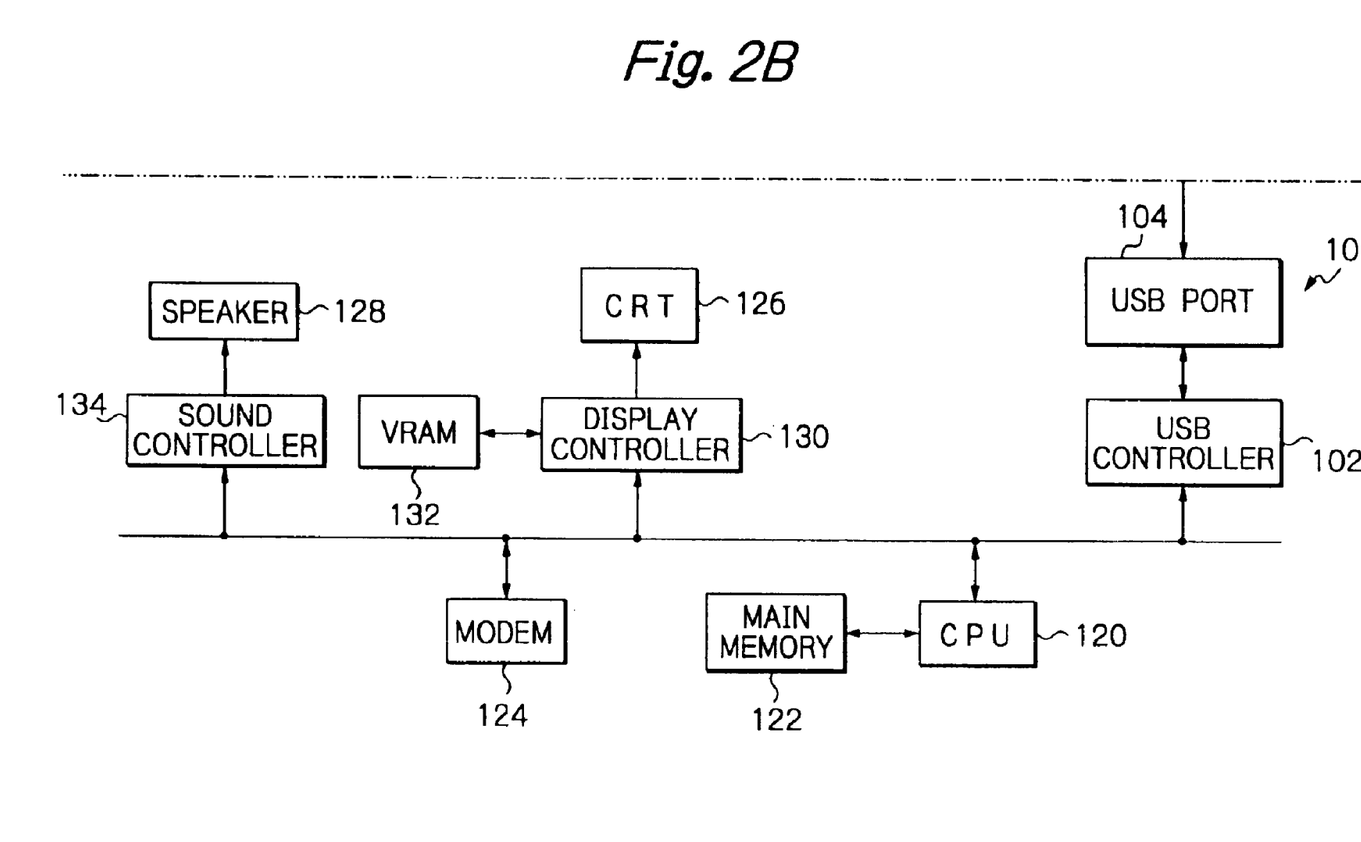
Figure 3:
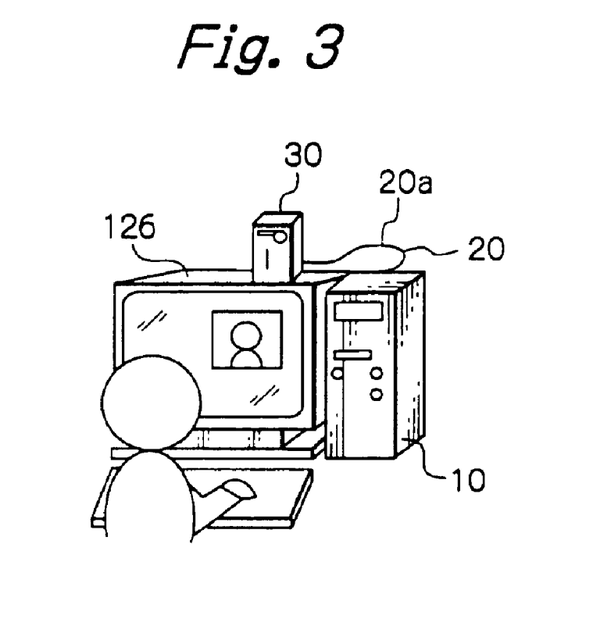
FIG. 3 is an external view showing a specific setup of the illustrative embodiment.

Referring to FIGS. 1 through 3 of the drawings, a computer system using a digital camera embodying the present invention is shown. As shown in FIG. 3 specifically, the computer system is generally made up of a personal computer or similar host computer 10, a USB interface or high-speed serial interface 20, and a digital camera 30 removably connected to the host computer 10 via the USB interface or cable 20. While the computer system plays the role of an image transfer system, it is implemented as a terminal included in, e.g., an electronic conference system in the illustrative embodiment.

In the illustrative embodiment, the host computer 10 recognizes the digital camera 30 as three different devices via the USB interface 20 at the same time. The three devices are a storage device for storing still pictures taken beforehand, an image device for recording image data representative of a real-time moving picture, and an operating device for allowing the operator of the host computer 10 to operate the storage device and image device. In the event of an electronic conference, the host computer 10 uses the digital camera 30 as a single peripheral unit having the above three different functions.

More specifically, as shown in FIG. 1, the host computer 10 includes a USB controller 102 for controlling the USB interface 20 and a USB port 104. A device driver 106, which is unique to the illustrative embodiment and adaptive to the digital camera 30, is also mounted on the host computer 10. As for a protocol, an application 108 for, e.g., an electronic conference system processes image data input via the device driver 106 by communication.

The USB controller 102 is a user interface including software belonging to a data link layer for controlling functions common to peripheral units. The USB controller 102 detects and sets a peripheral unit connected to the USB interface 20. Particularly, the USB controller 102 serves as a host for the USB interface 20 in that it generates a timing of consecutive frames to be transferred at the intervals of 1 millisecond and controls the scheduling of the individual frame at the time of data transfer between the peripheral unit and the device driver or upper layer 106. The USB port 104 belongs to a physical layer to which the USB cable 20a is connected. The USB port 104 plays the role of a transceiver driver that detects the supply of power and the connection and disconnection of a peripheral unit, and also detects the input or output of data.

The device driver 106 is implemented as driver software for driving and controlling the individual function of the digital camera 30 via the USB interface 20. More specifically, in the illustrative embodiment, the device driver 106 is system control software to be installed from a CD-ROM (Compact Disk Read Only Memory) so as to cooperate with an OS (Operating System) or similar basic software. Particularly, in the illustrative embodiment, the device driver 106 includes a storage driver or storage-class driver function 110, an image driver or image-class driver function 112, and an operation driver or driver function 116, which implements an operating device. The device driver 106 additionally includes an audio driver or audio-class driver function 114 and a system rewrite driver 118.

The storage driver 110 recognizes the digital camera 30 as a storage for storing image data or image files representative of still pictures. The storage driver 110 then controls a procedure for writing the image data or image files in a memory card, not shown, or reading them out of the memory card. The memory card is removably loaded on the digital camera 30, as will be described specifically later. In the illustrative embodiment, when a write request or a read request is generated, the storage driver 110 accesses the memory card by outputting a write command or a read command under the control of the application 108. At this instant, data transfer should preferably be implemented by bulk transfer that transfers data during the idle time of a frame. Bulk transfer allows the maximum sixty-four bytes of data to be transferred every period.

The image driver 112 recognizes the digital camera 30 as an image pickup apparatus for generating data representative of a moving picture. The image driver 112 controls a procedure for reading the above image data out of an image pickup system included in the camera 30. In the illustrative embodiment, isochronous transfer, which transfers a preselected amount of image data every frame, is advantageously applicable to the image driver 112.

When a microphone is mounted on the digital camera 30, the audio driver 114 receives data representative of a speech input via the microphone. Isochronous transfer is advantageously applicable to the audio driver 114 also, so that a preselected amount of audio data can be transferred every frame in accordance with the control of the image driver 112. So long as any other peripheral unit having an isochronous transfer capability is not connected to the USB port 104, the audio driver 114 using isochronous transfer can transfer the maximum 1,023 bytes of image data representative of a moving picture and the maximum sixty-four bytes of speech data frame by frame.

The operation driver 116 outputs various commands for operating the digital camera 30 in accordance with the operator's manipulation of, e.g., a mouse connected to the host computer 10. The commands include a command representative of a shutter speed, a lens opening, zoom magnification or similar setting for a shot, a command for taking a still picture in response to a shutter release button depressed, and a command for causing a strobe to flash. For the transfer of data representative of such commands, interrupt transfer or control transfer that periodically polls a device every frame should preferably be used.

The system rewrite driver 118 is used to rewrite system software installed in the camera 30. When new functions should be added to the camera 30 or when the functions of the camera 30 should be altered, the system rewrite driver 118 feeds new system software of higher version to the camera 10. Again, bulk transfer is desirable for data transfer because it guarantees the contents of data.

On the other hand, the protocol configuration of the digital camera (simply camera hereinafter) 30 includes a USB port 302 and a USB controller 304 adaptive to the USB interface 20, and a system controller 306 adaptive to the device driver 106 of the host computer 10. The USB port 302 belongs to a physical layer to which the USB cable 20a is connected. The USB port 302 is a transceiver driver that receives power via the USB port 104 of the host computer 10 and detects the input and output of data.

The USB controller 304 includes software belonging to a data link layer adaptive to the USB interface 20. The USB controller 304 is an interface for detecting the commands, which are included in the interrupt transfer and control transfer fed from the host computer 10, and controlling data conversion in accordance with the isochronous transfer or the bulk transfer. The USB controller 304 delivers the detected commands to the system controller 306.

The system controller or main controller 306 of the camera 30 drives the various sections of the camera 30, including the image pickup system and a recording system, in accordance with the commands received from the host computer 10. In the illustrative embodiment, the system controller 306 has a function of analyzing the above commands. Particularly, operating the various sections on the basis of the result of analysis, the system controller 306 controls the periodic reading of image data representative of a moving picture out of the image pickup system for the isochronous transfer. Further, the system controller 306 controls the writing of image data or files representative of still pictures in the memory card or the reading of the same out of the memory card in accordance with bulk transfer. In addition, in the illustrative embodiment, the system controller 306 executes control when the system software fed from the host computer 10 by bulk transfer should be rewritten.

FIG. 2A shows the configuration of the camera 30 more specifically. As shown, the camera 30 includes an image sensor 308 to which the image of a scene to be picked up is incident via optics, not shown, including a lens. The image sensor 308 transforms the incident image to, e.g., R, G and B (Red, Green and Blue) image signals and may advantageously be implemented by a CCD or similar solid-state image sensor. The output of the image sensor 308 is connected to an analog-to-digital converter (ADC) 310. The ADC 310 converts the analog image signals output from the image sensor 308 to corresponding digital data. The output of the ADC 310 is connected to a memory controller 312 and a YC (luminance and chrominance) signal processing 316.

A memory controller 312 selectively writes the image data output from the ADC 310 or the image data output from the YC signal processing 316 in a frame memory 314. Also, the memory controller 312 selectively feeds, under the control of the system controller 306, image data representative of a moving picture to either an LCD (Liquid Crystal Display) interface (I/F) 320 or the USB controller 304 every preselected period. Further, the memory controller 312 delivers image data representative of a still picture taken to a memory card I/F 322. In this sense, the memory controller 312 plays the role of a data controller as well. In the illustrative embodiment, the memory controller 312 should preferably reduce, or thin, the image data representative of a moving image by a preselected number of pixels when such data are transferred by isochronous transfer. In such a case, the memory controller 312 will read out the data by an amount and at a rate matching with the transfer rate of the USB interface 20.

In the illustrative embodiment, the YC signal processing 316 executes white balance adjustment, tone correction and other conventional preprocessing and calculations for transforming the R, G and B image data to YC data, i.e., a luminance signal (Y) and chrominance signals (C). The output of the YC signal processing 316 is connected to the memory controller 312 and a compression/expansion 318. The compression/expansion 318 compresses the image data output from the YC signal processing 316 with a preselected coding scheme. In the illustrative embodiment, the compression/expansion 318 includes an expanding circuit that expands compressed image data at the time of reproduction of a stored image.

The LCD I/F 320 transfers the image data fed from the memory controller 312 to an LCD or monitor 326. The LCD 326 displays, e.g., a moving picture representative of a scene being picked up or a still picture, or preview picture, picked up. Such an image is represented by the image data input to the LCD 326 via the LCD I/F 320. In the illustrative embodiment, when the USB interface 20 is connected to the digital camera 30, the LCD 326 is not used. That is, the LCD 326 is used mainly as a finder at the time of an ordinary shot.

The memory card I/F 322 writes the data or the file representative of a still picture in a memory card 324 or reads it out of the card 324 under the control of the system controller 306, although connection between the I/F 322 and the card 324 is not shown specifically. Particularly, in the illustrative embodiment, when the host computer 10 accesses the digital camera 30, the memory card I/F 322 transfers the data or the file read out of the memory card 324 to the USB controller 304 or writes data or a file received via the USB controller 304 in the memory card 324.

The memory card 324 is a recording medium removably mounted to the camera 30 and is loaded with a plurality of EEPROMs (Electrically Erasable and Programmable ROMs) or similar memory devices.

In the illustrative embodiment, the camera 30 additionally includes a microphone or speech input section 328, an amplifier 330, an ADC 332, and a speech data processing 334. The microphone 328, implemented by a miniature condenser microphone by way of example, feeds a speech signal input thereto to the amplifier 330. The amplifier 330 amplifies the speech signal to a preselected amplitude and delivers the amplified speech signal to the ADC 332.

The ADC 332 converts the input speech signal to digital speech data and feeds the digital speech signal to the speech data processing 334. The speech data processing 334 executes band compression and other preselected processing with the digital speech signal. When the host computer 10 accesses the camera 30, the data output from the speech data processing 334 is fed to the USB controller 304 under the control of the system controller 306.

The system controller 306 is a microcontroller for controlling the image pickup system including the image sensor 308, the signal processing system, and the display, and recording sections. For this aim, the system controller 306 is interconnected to the components of the camera 30. For simplicity, such interconnections are symbolically depicted with the arrows 307 in FIG. 2A. An EEPROM 336 storing control programs is connected to the system controller 306. In the illustrative embodiment, the program stored in the EEPROM 336 can be freely rewritten by an access input from the host computer 10 via the USB interface 20.

On the other hand, the host computer 10 may advantageously be implemented by a personal computer having a USB as standard equipment, e.g., a personal computer with PC97 having the 1,997 or later specifications. For example, as shown in FIG. 2B, the host computer 10 includes a CPU (Central Processing Unit) 120 that drives a MODEM 124, a CRT (Cathode Ray Tube) or display 126 and a speaker 128 for thereby executing, e.g., an electronic conference application. It is to be noted that FIG. 2B shows only part of the host computer 10 essential for the understanding of the illustrative embodiment.

The CPU 120 operates on the basis of an OS, a device driver and an application stored in a main memory 122. In the illustrative embodiment, to execute an electronic conference application, the CPU 120 controls the camera 30 via the USB interface 20 in order to receive data representative of a moving picture and speech data or data representative of a still picture. The received data are input to the MODEM 124.

The MODEM or data transmitting unit 124 is connected to a subscriber line or similar preselected communication channel for sending data with a preselected procedure. In the illustrative embodiment, the MODEM 124 sends image data and speech data received from the camera 30 to another computer joining in an electronic conference. Also, the MODEM 124 receives image data and speech data sent from another computer. The image data received from another computer is displayed on the CRT 126 via a display controller 130.

In the illustrative embodiment, the CRT 126 is a color display and should preferably have a multiwindow display capability. More specifically, the CRT 126 may advantageously display a picture received from another computer and a remote moving picture received from the digital camera 30 together as well as characters. The display controller 130 writes the image or images to be displayed on the CRT 126 in a VRAM (Video Random Access Memory) 132 and controls the display thereof.

On the other hand, the speech data input via the MODEM 124 is fed to a sound controller 134. The sound controller 134 reconstructs the speech data into the original speech signal and drives the speaker 128 with the speech signal.

The operation of the illustrative embodiment will be described hereinafter on the assumption that it executes an electronic conference application by way of example. First, a person participating in the conference shoots materials necessary for the conference with the camera 30 and so as to store the resulting image data in the memory card 324. At this stage of operation, the camera 30 is, of course, not connected to the USB 20 interface, but is used as an ordinary digital camera.

After shooting the materials, the participant connects one end of the USB cable 20a to the host computer 10 and the other end of the same to the camera 30. The participant then sets the digital camera 30 at a preselected position on the display 126, as shown in FIG. 3 specifically. The host computer 10 may be held in either one of an ON state and an OFF state at the time when the USB cable 20a is connected therefore, because the USB cable 20a has a hot-plug function.

Assume that the participant connects the USB cable 20a to the host computer 10 and then turns on the host computer 10. Then, the host computer 10 starts up the OS thereof, checks the device drivers and controllers, and then loads them on an operation menu, thereby constructing a system particular to the host computer 10. At this instant, the host computer 10 feeds power to a peripheral unit connected thereto via the USB port 104 and USB cable 20a. Subsequently, the USB controller 102, which has a host function, detects the peripheral unit connected to the USB cable 20a by control transfer so as to determine the kind of the peripheral unit and the kinds of transfer that the peripheral unit can deal with. Such a procedure is generally referred to as configuration. The camera 30, which is the peripheral unit in the illustrative embodiment, requests the host computer 10 to send all transfer services, including isochronous transfer and bulk transfer, to the camera 30. In response, the host computer 10 displays an icon representative of the camera 30 on, e.g., the operation menu. This allows the participant to operate the camera 30 and allows data to be transferred.

After the above-described connection, the participant starts up an electronic conference application on the host computer 10 and then operates it in a preselected way for calling the other computer via the MODEM 124. As a result, a communication channel is set up between the host computer 10 and the other computer. At this instant, the application 108 delivers a moving picture and speech transfer request to the device driver 106 and thereby starts up the image driver 112 and audio driver 114 included in the device driver 106. Subsequently, the USB controller 102 sends a moving picture transfer command and a speech transfer command to the camera 30 in the form of token packets, each at a particular timing of transfer frames.

The camera 30 starts driving the image sensor 308 and microphone 328 immediately after the receipt of power from the host computer 10. The camera 30 is therefore continuously picking up and processing the participant's image and speech. In this condition, the USB controller 304 included in the camera 30 detects the moving picture transfer command and speech transfer command sent from the host computer 10. These commands are fed from the USB controller 304 to the system controller 306. In response, the system controller 306 first reads a preselected amount of image data, which have been reduced to a preselected number of pixels, out of the frame memory 314 and delivers them to the USB controller 304. The preselected amount of image data may be 1,023 bytes of image data by way of example. The USB controller 304 constructs the input image data into a data packet and transfers it to the host computer 10 by isochronous transfer. Subsequently, the system controller 306 controls the speech data processing 334 in order to process speech data input via the microphone 328, amplifier 330, and ADC 332. The system controller 306 first feeds sixty-four bytes of processed speech data to the USB controller 304. Again, the USB controller 304 constructs the input speed data into a data packet and sends it to the host computer 10 by isochronous transfer.

The procedure described above is repeated thereafter. Specifically, the host computer 10 sends the moving picture transfer command and speech transfer command every 1 millisecond. Every time the digital camera 30 receives the above commands, it transfers, e.g., 1,023 bytes of image data and sixty-four bytes of speech data to the host computer 10 by isochronous transfer. Consequently, a transfer rate of about 10 Mbps (megabits per second) is achievable as to image data, so that about 10 frames can be transferred with, e.g., a CIF (Common Intermediate Format) resolution. More specifically, in the camera 30, after one frame of image data has been read out of the frame memory 314, the next frame is read out of the image sensor 308, written to the frame memory 314, and then read out. In this manner, consecutive frames are sequentially read out and transferred. Real-time speech data can be transferred at a rate of 64 kbps (kilobits per second).

The host computer 10 executes preselected processing (compression, if necessary) with the image data representative of a moving picture and speech data received from the digital camera 30. The processed image data and speech data are sent to another computer via the MODEM 124 and communication channel. On receiving image data and speech data from the other computer, the host computer 10 drives the display controller 130 and sound controller 134 so as to display the other participant, who is operating the other computer, on the CRT 126 while outputting a speech via the speaker 128. In this manner, the participants can converse with each other while watching each other's real-time expressions.

When the participant operating the host computer 10 desires to present a material during the conference, the participant clicks the icon representative of the camera 30 with, e.g., a mouse and then selects an item for accessing the memory card 324. This starts up the storage driver 110 included in the device driver 106 and causes the USB controller 102 to send a card access command to the camera 30 by interrupt transfer.

In the camera 30, the USB controller 304 detects the card access command sent from the host computer 10 and delivers it to the system controller 306. In response, the system controller 306 accesses the memory card 324 via the memory card I/F 322. The system controller 306 then reads image data representative of, e.g., index images of the still pictures out of the memory card 324, sixty-four bytes at a time, at a bulk transfer timing. Such image data are fed to the USB controller 304. The USB controller 304 constructs the input image data into packet data and sends them to the host computer 10 by bulk transfer.

The host computer 10 executes error checking with the image data received from the camera 30 by using a CRC (Cyclic Redundancy Check) code. If the image data are free from errors, the host computer 10 returns an ACK (ACKnowledge) handshake packet representative of successful receipt to the camera 30; if otherwise, the former returns a NACK (Not ACKnowledge) handshake packet representative of an error to the latter. On receiving the NACK handshake packet, the camera 30 again sends the same image data to the host computer 10 at the next bulk transfer timing.

The host computer 10, received the entire index image data from the camera 30, forms a window separate from the moving picture on the CRT 126 and displays the index images in the window. The participant, watching the index images on the CRT 126, selects the desired still picture or material. The host computer 10 sends the resulting command indicative of the still picture selected to the camera 30 at an interrupt transfer timing. In response, the camera 30 again accesses the memory card 324, reads the image data representative of the still picture selected out of the memory card 324, and sends the image data to the host computer 10 by bulk transfer.

If the receipt of the image data representative of the still picture selected is successful, the host computer 10 displays the still picture on the CRT 126. If the participant accepts the still picture appearing on the CRT 126, the host computer 10 sends the image data to another computer via the MODEM 124. The two participants are now capable of discussing with each other while watching the still picture or material prepared beforehand.

As stated above, every time a material or still picture prepared beforehand is required, image data representative of the material is read out of the memory card 324 and transferred from the camera 30 to the host computer 10 by bulk transfer. The host computer 10 displays the material on the CRT 126 and sends it to the other computer.

Likewise, when the host computer 10 receives data representative of a material in the form of a still picture from the other computer, it displays it on the CRT 126 and allows the participant to discuss with the participant operating the other computer. To allow the material discussed to be again used later, the host computer 10 may transfer the received image data representative of the material to the camera 30 by bulk transfer, so the image data can be written to the memory card 324.

Assume that the participant operating the host computer 10 needs a new material for discussion that has not picked up by the camera 30 beforehand. Then, the participant clicks the icon representative of the digital camera 30 and then selects an item relating to a shoot mode. In response, the host computer 10 starts up the operation driver 116 and allows the participant to operate the camera 30 via the host computer 10. For example, when the participant positions a desired material in front of the camera 30, a remote image representative of the material appears on the display 126 because of the previously stated transfer of a moving picture. As the participant, watching the remote picture, focuses the digital camera 30 to the material, the host computer 10 sends the resulting operation command to the camera 30 by interrupt transfer. In response, the system controller 306 controls the optics of the camera 30 for focusing the camera 30. Likewise, when the participant performs a zooming operation in order to enlarge the picture, the host computer 10 again sends the resulting command to the camera 30 by interrupt transfer. In response, the camera 30 controls the optics or the memory controller 312 thereof in such a manner as to enlarge the picture by optical or electronic zooming.

After the desired picture has been so framed, the participant can select the release of the shutter of the camera 30 on the host computer 10 so as to shoot the material in the form of a still picture. The participant may select a strobe function available with the camera 30 on the host computer 10 in order to illuminate the material at the time of the release of the shutter, if desired. Image data representative of the new material is also sent from the camera 30 to the host computer 10 by bulk transfer. Such image data may also be written to the memory card 324, as needed.

As stated above, to receive image data representative of a moving picture from the camera 30 together with speech data, the host computer 10 starts up the image driver 112 and audio driver 114. The camera 30 then transfers a preselected amount of data to the host computer 10 by isochronous transfer every transfer frame. The host computer 10 starts up, if necessary, the storage driver 110, causing the camera 30 to transfer data representative of still pictures taken beforehand by bulk transfer. In the same time instant, the host computer 10 also confirms the data representative of still pictures. Further, the host computer 10 starts up, if necessary, the operation driver 116, so that the participant can pick up a still picture any time during discussion. Image data representative of this still picture is also transferred from the camera 30 to the host computer 10. In this manner, not only image data representative of a moving picture and speech data but also image data representative of still pictures can be sent from the camera 30 to the host computer 10 for facilitating discussions.

On the other hand, assume that the program or data stored in the EEPROM 336 of the camera 30 must be rewritten due to the extension or the alteration of the functions of the camera 30. Then, the participant or operator again connects the camera 30 and host computer 10 by use of the USB cable 20a. Subsequently, the operator selects the icon indicative of the digital camera 30 in, e.g., the operation menu and then selects an item relating to system rewriting. In response, the host computer 10 starts up the system rewrite driver 118. When the operator inserts a floppy disk storing, e.g., a new program of higher version into the host computer 10, the host computer 10 reads the program.

After the reading of the new program, the USB controller 102 of the host computer 10 sends a system rewrite command to the camera 30. In response, in the camera 30, the USB controller 304 delivers the system write command to the system controller 306, preparing for the rewriting of the EEPROM 336. Subsequently, the host computer 10 sequentially sends the data of the new program or software to the camera 30 by bulk transfer. In the camera 30, the USB controller 304 executes code error checking with the data each time of bulk transfer and sends an ACK packet or a NACK packet to the host computer 10. The data successfully received are input to the system controller 306 and then written to the EEPROM 336 by a preselected procedure. As a result, the entire new program or data are written to the EEPROM 336.

As described above, the illustrative embodiment provides the host computer 10 with the device driver 106 adaptive to the camera 30 and including the storage driver 110, image driver 112, audio driver 114, and operation driver 116. Therefore, in the event of an electronic conference, a single camera 30 can be connected to the host computer 10 by the USB cable 20a and effectively used as an apparatus for providing the host computer 10 with image data representative of a moving picture and speech data as well as data representative of still pictures. In addition, with the system rewrite driver 118 also included in the device driver 106, it is possible to readily add new functions to the digital camera 30 or to readily alter the functions of the camera 30 via the USB interface 20.

Figure 4:
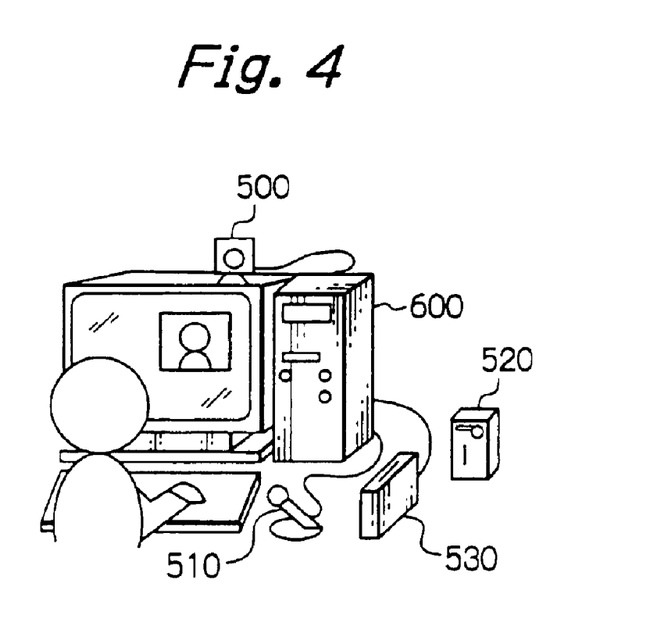
FIG. 4 is an external view showing a specific comparative setup of a computer system.

FIG. 4 shows a specific setup of a comparative computer system. As shown, the comparative computer system includes a host computer 600 and a digital camera 500 connected to the host computer 600 as an apparatus for generating image data, which is representative of a moving picture. A microphone 510 is also connected to the host computer 600 and plays the role of an apparatus for generating speech data. Further, a card reader/writer 530 is connected to the host computer 600 when image data representative of still pictures are desired. The card reader/writer 530 writes or reads image data in or out of a memory card removably loaded on the digital camera 520. By contrast, in the illustrative embodiment, only the camera 30 is connected to the host computer 10 by the USB cable 20a, as described with reference to FIG. 3. The illustrative embodiment is therefore far simpler in configuration than the computer system of FIG. 4 and can effectively start operating only if use is made of, e.g., an icon representative of the camera 30.

While the illustrative embodiment has concentrated on an electronic conference application, the present invention is practicable with any other application in which image data representative of a moving picture, speech data, data representative of still pictures and shooting operations are dealt with either individually or in combination.

In the illustrative embodiment, the camera 30 is connected to the host computer 10 by the USB interface 20. If desired, the USB interface 20 may be replaced with IEEE 1394 that is a high-speed serial interface, in which case the USB ports 104 and 302 and USB controllers 102 and 304, FIGS. 1 and 2, will be interpreted as IEEE 1394 ports and IEEE 1394 controllers, respectively. Further, when use is made of the IEEE 1394 interface, it is desirable to transfer image data representative of a moving picture and speech data by IEEE 1394 isochronous transfer, which is repeated every 125 microseconds. Also, it is desirable to transfer image data representative of still pictures and operation commands by IEEE 1394 asynchronous transfer, which transfers data when a bus is idle after isochronous transfer.

Furthermore, the camera 30 may be replaced with a digital movie camera of the type taking and recording a moving picture or of the type taking and recording a still picture in addition to a moving picture.

In summary, it will be seen that the present invention provides a computer system capable of executing, e.g., an electronic conference application with a simple system configuration including a digital camera, and realizing effective transfer of data representative of a moving picture or a still picture or the effective operation of the camera.

The entire disclosure of Japanese patent application No. 360815/1999 filed Dec. 20, 1999 including the specification, claims, accompanying drawings and abstract of the disclosure is incorporated herein by reference in its entirety.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. A computer system comprising:
   a host computer for electronic conferencing with another computer;
   a digital camera for picking up a scene with an image sensor and recording image data representative of said scene in a recording medium; and
   a high-speed serial interface connecting said digital camera to said host computer;
   said host computer comprising a device driver including:
   a first device function for recognizing said digital camera as a storage driver, which records data representative of a still picture, and at least one of writing and reading said image data at least one of in and out of the recording medium;
   a second device function for recognizing said digital camera as an image device, which generates image data representative of a moving picture, and reading said image data out of the image sensor at a preselected period; and
   a third device function for recognizing said digital camera as an operating device and feeding an operation command to said digital camera;
   said digital camera comprising a controller for driving, in response to an access made from one of said first device function, said second device function, and said third device function of said host computer via said high-speed serial interface, portions of said digital camera corresponding to said access to thereby control data transfer and a shooting operation,
   wherein said high-speed serial interface comprises at least one of a USB (Universal Serial Bus) serial interface and an IEEE 1394 serial interface,
   wherein, when said high-speed serial interface comprises said USB serial interface, during an electronic conference between said host computer and said another computer, the image data representative of a still picture is transferred by said first device function using bulk transfer, which transfers image data at an idle position of a transfer frame, and
   wherein, when said high-speed serial interface comprises said IEEE 1394 serial interface, during said electronic conference between said host computer and said another computer, the image data representative of said still picture is transferred by said first device function using asynchronous transfer, which transfers data when a bus is idle in a preselected transfer cycle.

2. A system in accordance with claim 1, wherein the image data representative of a moving picture is transferred by said second device function using isochronous transfer, which transfers a preselected amount of data every preselected frame, and wherein the operation command is transferred by said third device function using at least one of interrupt transfer and control transfer, which transfers data when polling at a preselected period.

3. A system in accordance with claim 1, wherein the image data representative of a moving picture is transferred by said second device using isochronous transfer, which transfers data by seizing a channel every preselected transfer cycle, and wherein the operation command is transferred by said third device function using said asynchronous transfer.

4. A system in accordance with claim 1, wherein said digital camera further comprises a speech input section for generating digital speech data representative of an input speech signal, and wherein said device driver of said host computer further comprises a fourth device function for receiving said digital speech data from said speech input section together with the image data representative of a moving picture via said high-speed serial interface.

5. A system in accordance with claim 2, wherein said digital camera further comprises a speech input section for generating digital speech data representative of an input speech signal, and wherein said device driver of said host computer further comprises a fourth device function for receiving said digital speech data from said speech input section together with the data representative of a moving picture via said high-speed serial interface.

6. A system in accordance with claim 3, wherein said digital camera further comprises a speech input section for generating digital speech data representative of an input speech signal, and wherein said device driver of said host computer further comprises a fourth device function for receiving said digital speech data from said speech input section together with the image data representative of a moving picture via said high-speed serial interface.

7. A system in accordance with claim 4, wherein said host computer further comprises a communicating section for interchanging data with another computer via a communication channel, and wherein said computer system comprises an electronic conference system capable of sending at least one of the image data representative of at least one of a moving picture and a still picture, and said digital speech data received via said high-seed serial interface to said another computer via said communicating section.

8. A system in accordance with claim 5, wherein said host computer further comprises a communicating section for interchanging data with another computer via a communication channel, and wherein said computer system comprises an electronic conference system capable of sending at least one of the image data representative of at least one of a moving picture and a still picture, and said digital speech data received via said high-speed serial interface to said another computer via said communicating section.

9. A system in accordance with claim 6, wherein said host computer further comprises a communicating section for interchanging data with another computer via a communication channel, and wherein said computer system comprises an electronic conference system capable of sending at least one of the image data representative of at least one of a moving picture and a still picture, and said digital speech data received via said high-speed serial interface to said another computer via said communicating section.

10. A system in accordance with claim 1, wherein said digital camera further comprises a storage for rewritably storing system software assigned to said digital camera, and wherein said device driver of said host computer further comprises a fifth device function for rewriting said system software via said high-speed serial interface.

11. A system in accordance with claim 7, wherein said digital camera further comprises a storage for rewritably storing system software assigned to said digital camera, and wherein said device driver of said host computer further comprises a fifth device function for rewriting said system software via said high-speed serial interface.

12. A system in accordance with claim 8, wherein said digital camera further comprises a storage for rewritably storing system software assigned to said digital camera, and wherein said device driver of said host computer further comprises a fifth device function for rewriting said system software via said high-speed serial interface.

13. A system in accordance with claim 9, wherein said digital camera further comprises a storage for rewritably storing system software assigned to said digital camera, and wherein said device driver of said host computer further comprises a fifth device function for rewriting said system software via said high-speed serial interface.

14. In a digital camera for picking up a scene with an image sensor and recording image data representative of said scene in a recording medium and operable under a control of an outside apparatus via a high-speed serial interface, said outside apparatus comprises:

a device driver comprising:

a first device function for recognizing said digital camera as a storage driver, which records data representative of a still picture, and at least one of writing and reading said image data at least one of in and out of the recording medium;

a second device function for recognizing said digital camera as an image device, which generates image data representative of a moving picture, and reading said image data out of the image sensor at a preselected period; and a third device function for recognizing said digital camera as an operating device and feeding an operation command to said digital camera;

said digital camera comprising a controller for driving, in response to an access made from one of said first device function, said second device function, and said third device function of said host computer via said high-speed serial interface, portions of said digital camera corresponding to said access to thereby control data transfer and a shooting operation, wherein said high-speed serial interface comprises at least one of a USB (Universal Serial Bus) serial interface and an IEEE 1394 serial interface, wherein, when said high-speed serial interface comprises said USB serial interface, during an electronic conference between said outside apparatus and another outside apparatus, the image data representative of a still picture is transferred by said first device function using bulk transfer which transfers image data at an idle position of a transfer frame, and wherein, when said high-speed serial interface comprises said IEEE 1394 serial interface, during said electronic conference between said outside apparatus and another outside apparatus, the image data representative of said still picture is transferred by said first device function using asynchronous transfer, which transfers data when a bus is idle in a preselected transfer cycle.

15. A system in accordance with claim 14, wherein, when said high-speed serial interface comprises said USB serial interface, during said electronic conference between said host computer and said another computer:

the image data representative of a moving picture is transferred by said second device function using isochronous transfer, which transfers a preselected amount of data every preselected frame, and the operation command is transferred by said third device function using at least one of interrupt transfer and control transfer, which transfers data when polling at a preselected period.

16. A system in accordance with claim 14, wherein, when said high-speed serial interface comprises said IEEE 1394 serial interface, during said electronic conference between said host computer and said another computer:

the image data representative of said moving picture is transferred by said second device using isochronous transfer, which transfers data by seizing a channel every preselected transfer cycle, and the operation command is transferred by said third device function using said asynchronous transfer.

17. A computer system comprising:

a host computer for electronic conferencing with another computer;

a digital camera for picking up a scene with an image sensor and recording image data representative of said scene in a recording medium; and a high-speed serial interface connecting said digital camera to said host computer, wherein said host computer comprises:

first means for recognizing said digital camera as a storage driver, which records data representative of a still picture and at least one of writes and reads said image data at least one of in and out of the recording medium;

second means for recognizing said digital camera as an image device, which generates image data representative of a moving picture, and reads said image data out of the image sensor at a preselected period; and third means for recognizing said digital camera as an operating device and for feeding an operation command to said digital camera, wherein said digital camera comprises means for driving portions of said digital camera corresponding to said access, in response to an access made from one of said first means, said second means, and said third means of said host computer via said high-speed serial interface, wherein said high-speed serial interface comprises at least one of a USB (Universal Serial Bus) serial interface and an IEEE 1394 serial interface, wherein, when said high-speed serial interface comprises said USB serial interface, during an electronic conference between said host computer and said another computer, the image data representative of a still picture is transferred using bulk transfer, which transfers image data at an idle position of a transfer frame, and wherein, when said high-speed serial interface comprises said IEEE 1394 serial interface, during said electronic conference between said host computer and said another computer, the image data representative of said still picture is transferred using asynchronous transfer, which transfers data when a bus is idle in a preselected transfer cycle.

18. A system in accordance with claim 17, wherein said digital camera comprises means for generating digital speech data representative of an input speech signal, and wherein said host computer further comprises fourth means for receiving said digital speech data from said means for generating, together with the image data representative of a moving picture via said high-speed serial interface.

19. A system in accordance with claim 17, wherein said digital camera comprises means for rewritably storing system software assigned to said digital camera, and wherein said host computer further comprises fifth means for rewriting said system software via said high-speed serial interface.

20. A system in accordance with claim 1, wherein said electronic conference between said host computer and said another computer comprises a video conference.

21. A system in accordance with claim 14, wherein said electronic conference between said host computer and said another computer comprises a video conference.

22. A system in accordance with claim 17, wherein said electronic conference between said host computer and said another computer comprises a video conference.

23. A method of communicating between a host computer for electronic conferencing with another computer and a digital camera for picking up a scene with an image sensor and recording image data representative of said scene in a recording medium, said method comprising:

connecting said digital camera to said host computer with a high-speed serial interface;

recognizing said digital camera as a storage driver, which records data representative of a still picture and at least one of writes said image data in and reads said image data out of the recording medium;

recognizing said digital camera as an image device, which generates image data representative of a moving picture and reads said image data out of the image sensor at a preselected period;

recognizing said digital camera as an operating device;

electronic conferencing said host computer with said another computer;

controlling portions of said digital camera in response to a command made from said host computer via said high-speed serial interface, to thereby control data transfer between said digital camera and said host computer and a shooting operation of said digital camera; and performing, during said electronic conference between said host computer and said another computer, bulk transfer of image data between said digital camera and said host computer at an idle position of a transfer frame.

24. A method according to claim 23, further comprising:
performing isochronous transfer of a preselected amount of moving picture data between said digital camera and said host computer every preselected frame; and
performing at least one of interrupt transfer and control transfer of said operation command between said digital camera and said host computer when polling at a preselected period.

25. A computer system comprising:
a host computer for electronic conferencing with another computer;
a digital camera for picking up a scene with an image sensor and recording image data representative of said scene in a recording medium; and
a high-speed serial interface connecting said digital camera to said host computer;
said host computer comprising a device driver including:
   a first device function for recognizing said digital camera as a storage driver, which records data representative of a still picture, and at least one of writing and reading said image data at least one of in and out of the recording medium;
   a second device function for recognizing said digital camera as an image device, which generates image data representative of a moving picture, and reading said image data out of the image sensor at a preselected period; and
   a third device function for recognizing said digital camera as an operating device and feeding an operation command to said digital camera;
said digital camera comprising a controller for driving, in response to an access made from one of said first device function, said second device function, and said third device function of said host computer via said high-speed serial interface, portions of said digital camera corresponding to said access to thereby control data transfer and a shooting operation,
wherein said high-speed serial interface includes a capability of selectively connecting said digital camera to said host computer with a USB (Universal Serial Bus) serial interface and an IEEE 1394 serial interface,
wherein, when said high-speed serial interface comprises said USB serial interface, during an electronic conference between said host computer and said another computer, the image data representative of a still picture is transferred by said first device function using bulk transfer, which transfers image data at an idle position of a transfer frame, and wherein, when said high-speed serial interface comprises said IEEE 1394 serial interface, during said electronic conference between said host computer and said another computer, the image data representative of said still picture is transferred by said first device function using asynchronous transfer, which transfers data when a bus is idle in a preselected transfer cycle.

* * * * *